April 9, 1957 H. B. LIPPELT 2,787,983
HOUSED ANIMAL STALLS HAVING AUTOMATICALLY
OPERATING RELEASE MEANS
Filed April 29, 1953 7 Sheets-Sheet 1

INVENTOR.
HANS B. LIPPELT
BY
ATTORNEY.

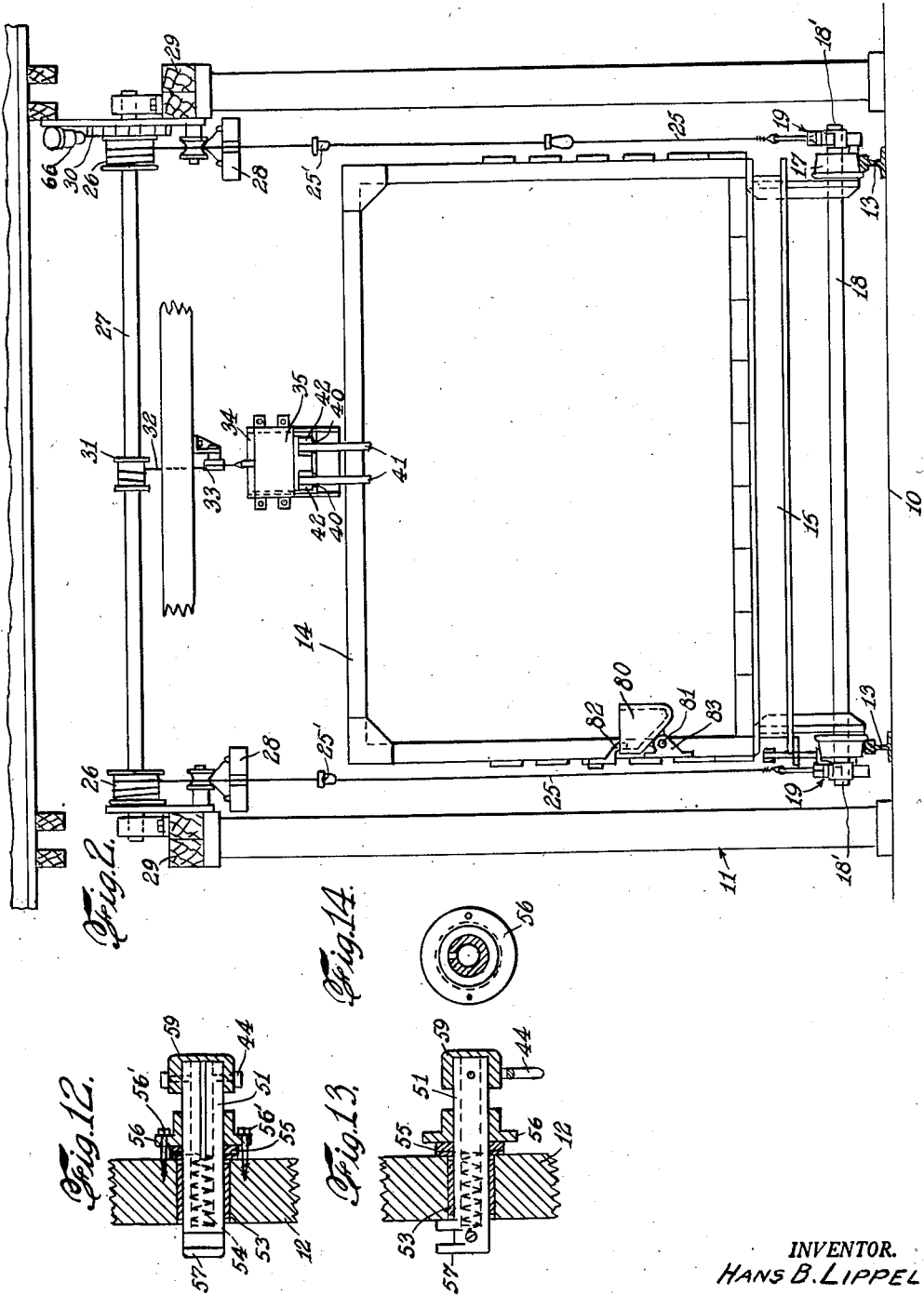

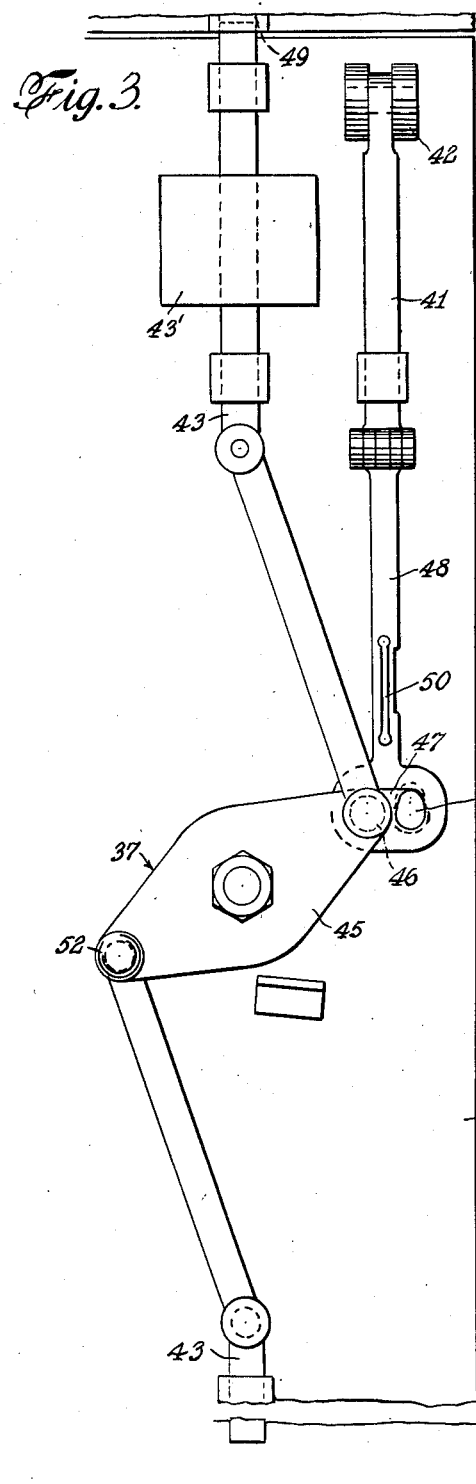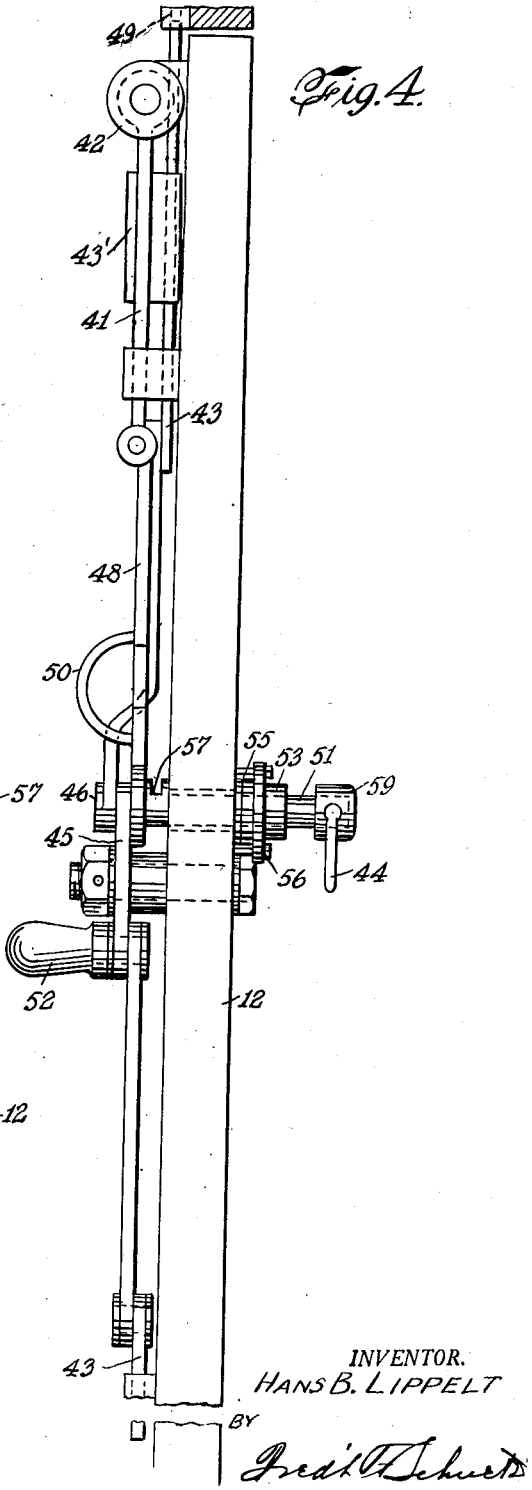

April 9, 1957

H. B. LIPPELT 2,787,983

HOUSED ANIMAL STALLS HAVING AUTOMATICALLY
OPERATING RELEASE MEANS

Filed April 29, 1953

INVENTOR.
HANS B. LIPPELT
BY
ATTORNEY

INVENTOR.
HANS B. LIPPELT

ATTORNEY

April 9, 1957
H. B. LIPPELT
2,787,983
HOUSED ANIMAL STALLS HAVING AUTOMATICALLY
OPERATING RELEASE MEANS
Filed April 29, 1953
7 Sheets-Sheet 6
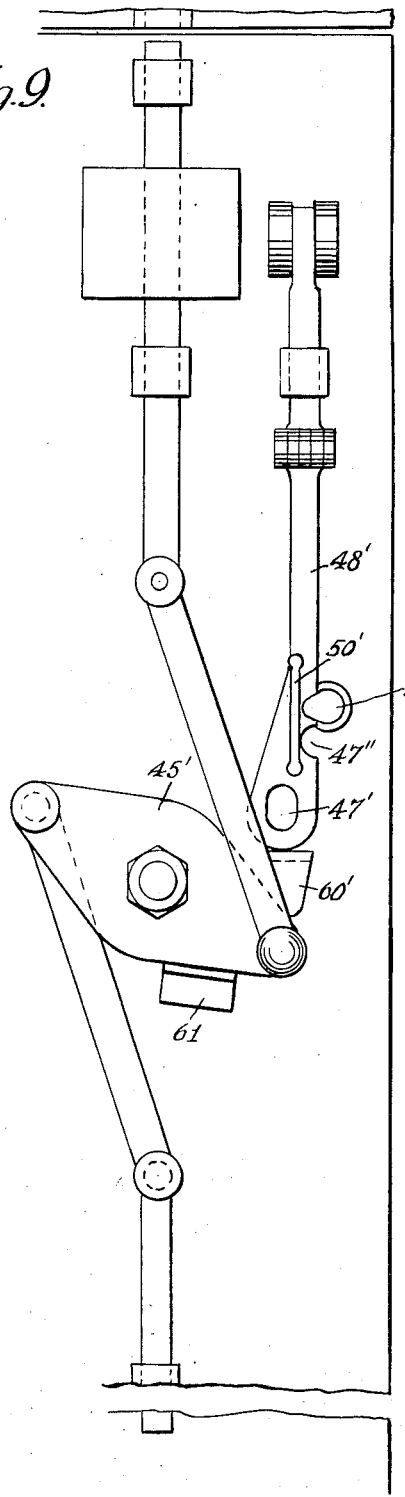
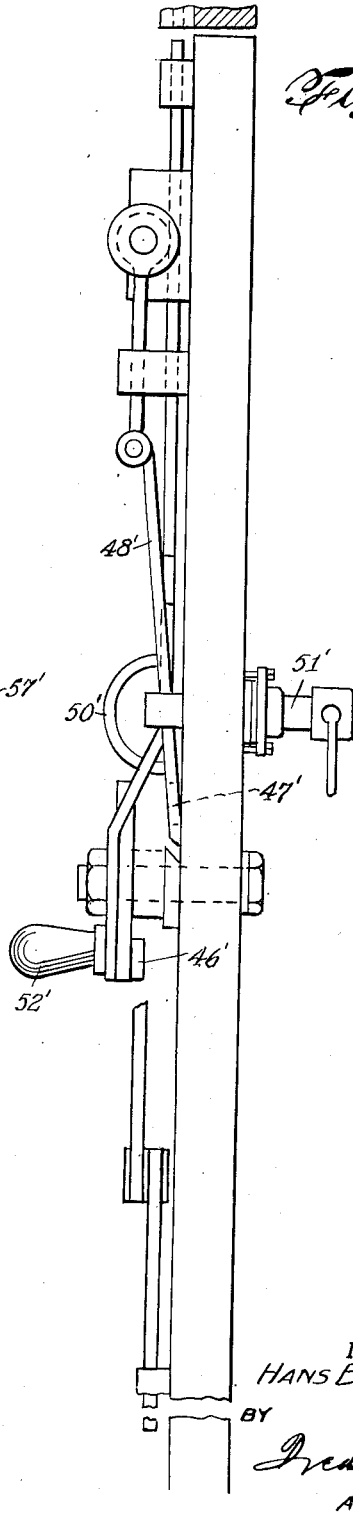
INVENTOR.
HANS B. LIPPELT
BY
ATTORNEY

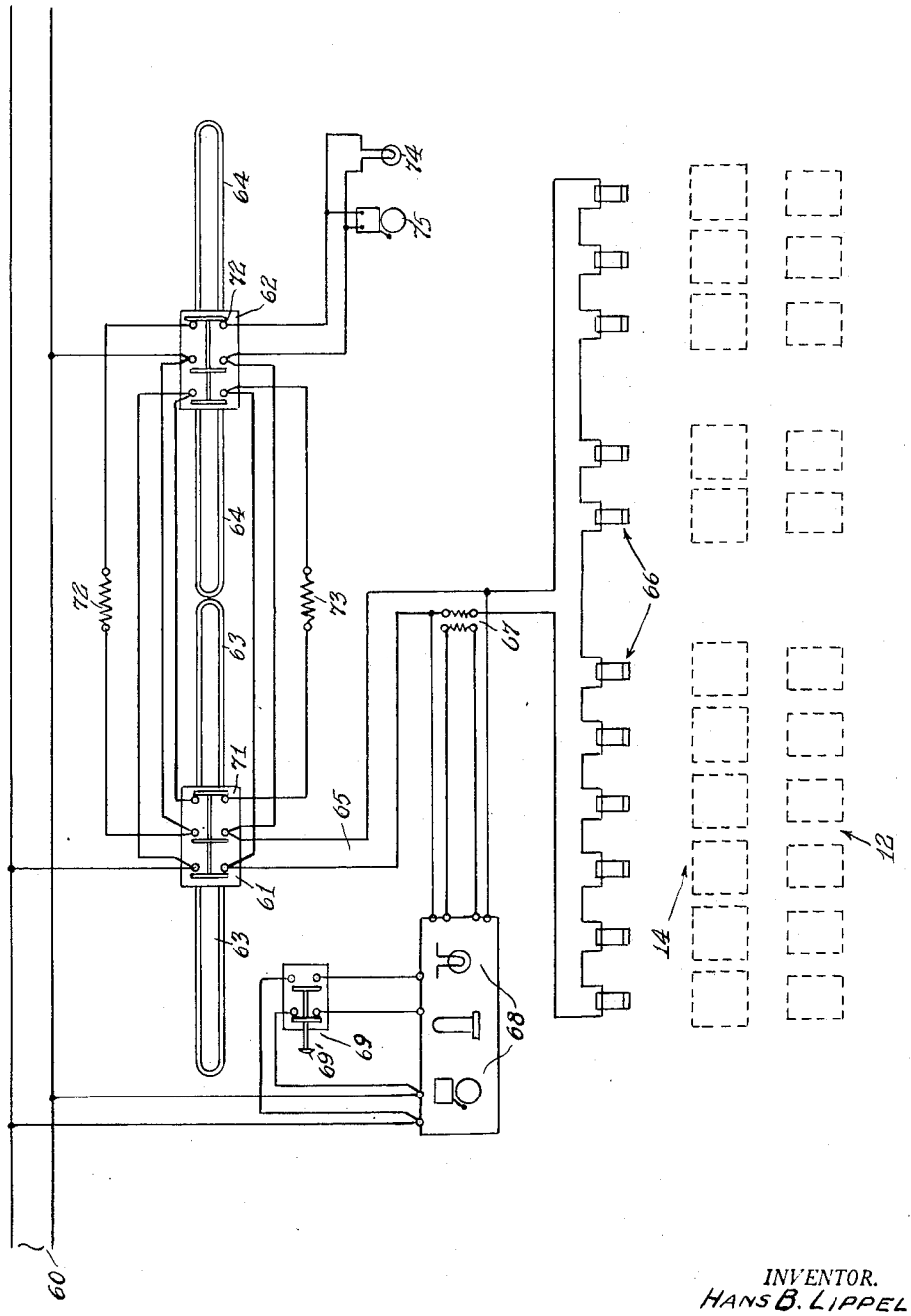

United States Patent Office 2,787,983
Patented Apr. 9, 1957

2,787,983

HOUSED ANIMAL STALLS HAVING AUTOMATICALLY OPERATING RELEASE MEANS

Hans B. Lippelt, Ozone Park, N. Y.

Application April 29, 1953, Serial No. 351,867

11 Claims. (Cl. 119—110)

The invention relates to housing means for animals, more especially of the pedigreed class and as housed in individual stalls provided in a conventional stable or like structure to retain individually the respective animals, for example, horses or cattle. It is a well known fact that animals, particularly horses, when thus confined will, in emergencies such as a fire, refuse to leave these quarters and even will attempt to return thereto if removed.

The present invention has for an object to provide means whereby under emergency conditions or for test a stall, or plurality of stalls, confining an animal or animals will be automatically advanced and moved out of the building to a location where access to said stall externally of the stable may be had, and removal of the animal from the stall to a place of safety be effected.

Another object of the invention is to provide a stall unit of generally conventional construction so that customary conditions will be retained and the general arrangement and equipment of stable or other housing not be disturbed to an objectionable extent.

Still another object of the invention is to provide for the automatic opening of stable doors, associated with respective stalls, if and when the stall, or stalls, automatically advances so that passage thereof through the said doors and exteriorly of the stable building may take place; also, to provide means for effecting manual opening of a door externally of the stable, as well as manual opening and closing thereof from the interior of the stable.

A further object of the invention is to so control the movement of the stalls, as well as of the doors, that their operation will be positive, for example, as under the action of the force of gravity or other suitable positive force or means.

A still further object is to provide thermally-responsive means to initiate the release of the stalls and doors.

The invention has for an object, also, to provide manual means for setting in operation the release operations; and, furthermore, to provide a supervisory system which will indicate operative status of the novel safety release arrangement without actually effecting its operation.

Another feature of the invention is to construct the trough for drinking water so large that it will hold enough water as will be necessary to cover the floor of the stall sufficient to drench any straw or like combustible material; and to provide means for effecting the tilting of the said trough simultaneously with the release of a stall.

In carrying out the invention, the stalls of a stable, instead of being a fixed integral portion thereof, are mounted for travel over the stable floor toward corresponding automatically-opening doors. Both the stalls and their respective doors normally are restrained against movement, and provision is made to release the same automatically in the event of a substantial rise of temperature as caused by fire starting within the stable or communicated thereto. This will permit the stalls to move out through their doors, for example on corresponding rails, to a location beyond the stable in which the animals had been confined, and convenient for release to a place of safety of said animals by an attendant or other party. Provision is made, also, whereby a door may be unlocked and opened manually from the outside, but not locked from the outside; and whereby it may be both locked and unlocked from the interior of the stable.

The invention contemplates, also, the provision of an alarm system operative upon automatic release of the stalls and opening of the doors, and also manually, together with an automatic electric supervisory system associated therewith. In addition, the simultaneous release of the stalls and opening of the doors may be accomplished manually from the interior of the stable.

The nature of the invention, however, will best be understood when described in connection with the accompanying drawings, in which:

Fig. 2 is a transverse section taken on the line 2—2, Fig. 1 of the drawings and looking in the direction of the arrows, but with the locking mechanism not shown.

Figure 5:
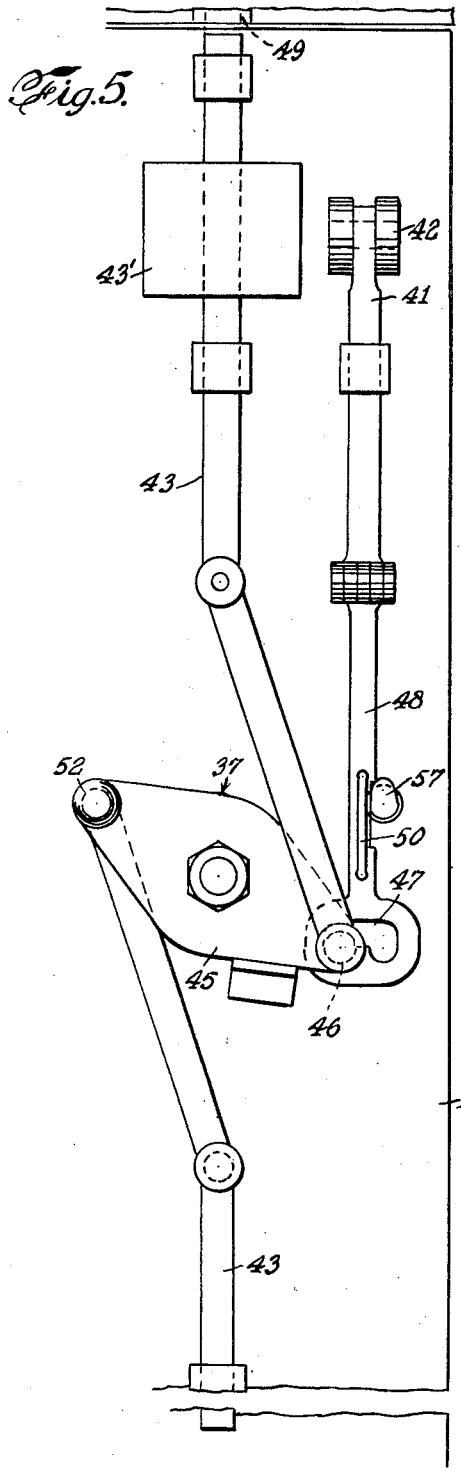
Figure 6:
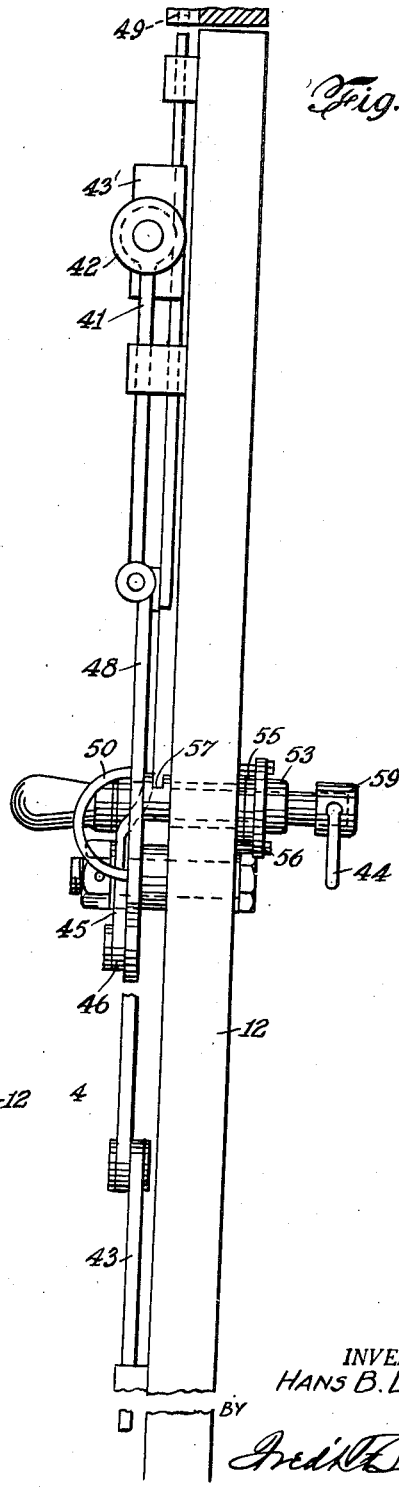
Figure 7:
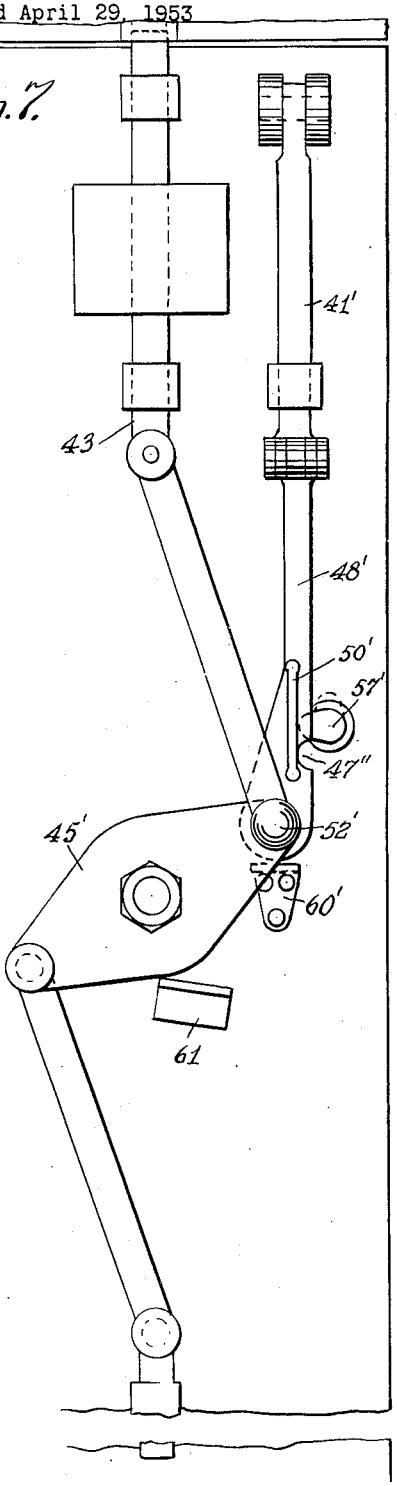
Figure 8:
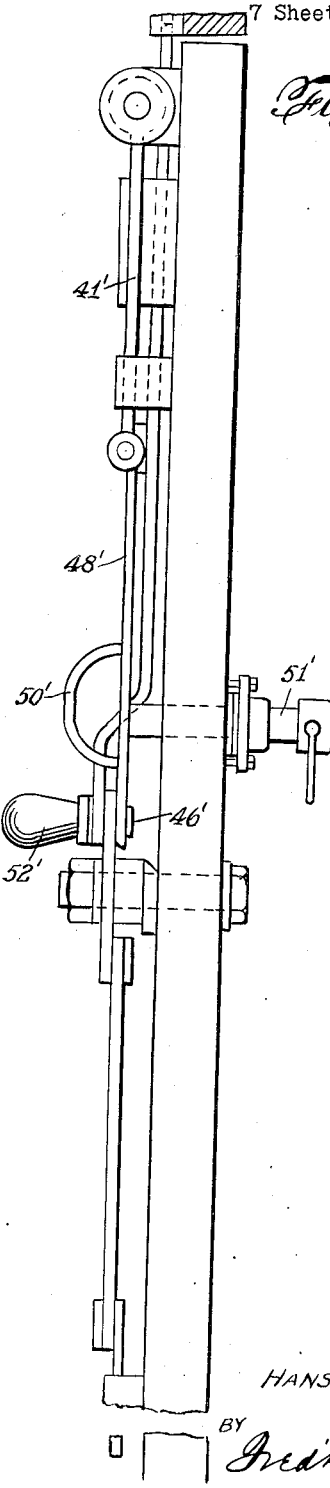

Figs. 3 to 6, inclusive, are fragmentary elevations of the inside of a door wing, in closed position and also in opened position; and illustrative a conventional door locking means as modified to conform to the novel automatic release arrangement, Figs. 3 and 4 being respectively a side and an end elevation and indicating the locked position, while Figs. 5 and 6 are similar views indicating the unlocked position of the members.

Figs. 7, 8 and 9, 10 are views similar to Figs. 3 to 6, and illustrative of a modification in the means for unlocking a door from the outside of the stable.

Fig. 11 is a schematic showing of the novel automatic release system, including the wiring circuits for control, supervision and alarm.

Figs. 12 to 14, inclusive, are detail views illustrating means for initiating opening of a door externally of the stable.

Referring to the drawings, 10 designates the floor of a stable 11 as a suitable housing for animals, the said floor in accordance with the invention being inclined downwardly toward the entrance doors, for example, comprising two wings—only one of which is indicated at 12 and both being biased to open upon release. A pair of tracks 13 is provided over the floor to support normally at the inner end a stall of which one, by way of example, is indicated at 14, the tracks affording respective lanes of travel for the stalls through the doors when the latter are opened upon release of the stalls, as will hereinafter be more fully set forth. The various sets of tracks are to be continued a suitable distance beyond the stable building to allow of access thereto, in case of emergency, for release of an animal; and well known expedients (not shown) may be provided to decelerate and bring to a standstill then a stall at such location.

The invention, however, is concerned more especially with the means for movably mounting individual stalls and with means whereby the same may be released automatically or manually under emergency conditions and the doors opened, also automatically, to pass the moving stalls exteriorly of the stable. Each stall, which is constructed, preferably, of fireproof material, substantially along the lines of the conventional stall and having the various appurtenances pertaining thereto, is carried through its bottom framing 15 by two pairs of wheels 16, 17 designed to roll over the tracks provided. Since the latter are pitched to cause the stall normally to roll outwardly thereover, provision is made to block this action until an emergency arises, or a manual release means, hereinafter described, is actuated.

The axle 18 of the forward wheels of a stall support carriage, for example, is to this end extended at each end beyond the corresponding forward wheels as is indicated at 18'; and these extensions are caused to be engaged by anchoring means 19 juxtaposed thereto. To this end, a member 20 is pivoted at each side of the stall, for example, to the corresponding track, as is indicated at 21; and its forward end extends beyond an axle extension 18' and is then turned back upon itself or carries a down-turned portion 22 directed toward and adapted to contact the said axle extension 18'. The curvature of the portion 22, or, if straight, its angle with the member 20, is such that it will be self-locking. That is to say, under the component of the roll tendency or force of the stall to advance over the tracks, the hubs or extensions 18' press upon the corresponding portions 22 in a direction which will tend to move them with their members 20 downwardly to restrain tightly the stall from outward movement.

When an emergency arises, provision is made to exert an upward pull on the members 20 to cause this restraining influence to be overpowered so that a stall may roll freely forward, under the action of gravity, over its track. This may be effected by cables 25 attached at one end to the members 20 at their respective free ends, the cables each having rigidly attached thereto a cushioned knob or stop 25', and are wound over respective rotative drums 26 which are secured to opposite ends of a rotatable shaft 27. Each of the cables at its free end has attached thereto a weight 28 or like means exerting a force in a direction tending to elevate a member 20.

To this end, the shaft 27 is supported by the rafters 29 of the stable; and there is associated with one of the drums 26 a ratchet wheel 30 having an engaging pawl 30' which checks normally the action of the weights 28 on the members 20 and until such time as the stalls are to be released. Either weight 28 falling, when released at the ratchet wheel, will come to a halt when it meets with the cushioned knob 25', which is rigidly attached to the cable as hereinbefore noted. The rise of said knob or stop, when the release occurs, also limits the extent of lifting of the member 20 through engagement of weight 28 therewith in its downward course.

There is fixed on the shaft 27 a further but smaller drum 31 to which is attached one end of a cable 32 running over a guide pulley 33 and having its free end attached to a slide element 34. The latter is designed to control the release automatically of a door 12 when the pawl 30' is disengaged from its ratchet wheel 30 for release of a stall. The slide 34 to this end is mounted to ride vertically in a guide 35 secured fixedly to the stable wall 36. Means are associated, as will hereinafter be more fully set forth, with conventional means 37 for locking the door halves 12, and the same are to be rendered operative for automatic unlocking when the said pawl 30' becomes disengaged. This unlocking provision includes the slide element 34 which, for example, is provided with a shelf 39 at its lower edge and having a pair of notches 40 inwardly from its exposed edges to accommodate the control bars 41—one from each door half, and each terminating at the upper end in a pair of rollers 42. The latter are designed to ride inwardly over said shelf to sustain, when the door is locked, the bars 41 in an elevated position. The said bars are designed, also, for interconnection with the upper of the locking bolts 43 of the associated conventional locking means 37.

In order to insure this release and unlocking of a door, the upper bolt of the locking bolts 43 of a set of the conventional locking means is loaded with a suitable weight 43' or like means for biasing it to a downward (unlocking) movement. The release may be effected both from the inside and the outside of the stable. In the latter instance, this is effected by rotating through an angle of 90° a handle 44 protruding outwardly from said door and then pushing it axially inwardly to a predetermined extent and reversing to the normal position. This serves to disengage the control bars 41 from the locking bolts, as will hereinafter be more fully set forth.

However, a door may not be locked from the outside since this might jeopardize the safety feature; but provision is made to lock the said door solely from within the stable, as well as to unlock it both manually and automatically. Thus, the actuating lever plate 45 for the conventional lock system 37 has a link-stud 46 extended axially to engage in a slot 47 of the enlarged lower end of a depending control bar extension link 48. The latter will, when the roller end drops with the shelf 39 under automatic release of said slide upon lifting of pawl 30', then carry with it the stud connection to effect disengagement of locking bolts 43 with their respective sockets 49, whereupon the door wings will swing open under the action of gravity.

To effect such release manually, from within the stable, an operating handle 50 is provided on the link 48 to lift the link 48 and effect the disengagement of its slotted lower end from stud 46, whereby under the influence of weight 43' the bolts 43 will be released (Figs. 5 and 6) and the cooperating door wings, due to their unbalanced hanging, will swing open automatically.

To again set the door wings in locked condition, it is necessary to re-engage the slotted end of the control bar link 48 with stud 46 of the locking mechanism 37. A said link and its bar are, therefore, to be lifted sufficiently to juxtapose its rollers to the holding level of shelf 39 and the lower end of the link then rested temporarily on the inner side of a lobe of a hollow plunger element 51 of the handle 44. This will permit the closing of a wing with the rollers riding onto the shelf to retain the bar in its elevated and locking position. An operating handle 52 provided on lever plate 45 is then manually swung upwardly to extend the bolts 43 into their locking sockets 49; and the link 48 swung off the supporting plunger and its slot re-engaged over stud 46, thus to retain the locking mechanism in position, Figs. 3 and 4.

In order to open the door manually from the outside, a novel arrangement is provided for effecting a temporary disengagement of the control bar mechanism from the locking bolt mechanism, it being understood that no provision is to be made, as has been hereinbefore noted, to effect the locking of a door from the outside. With a door locked, the conventional lock system 37 is interlinked with the control bars 41, and it will be apparent that if this linkage be interrupted, the bolts will be free to withdraw from their sockets automatically under the action of the weight 43'.

The handle 44, to this end, includes the said plunger portion 51 axially movable within a sleeve 53 fitted in the door, Figs. 12 to 14, the plunger extending inwardly through said sleeve to project beyond the inner surface of the door 12 and being located near the butt-line of the two wings of said door. The said plunger is biased by means of a spring 54, held between a screw 54' and a pair of spacer washers 55 about the plunger, to move outwardly to its normal position, as is indicated in Figs. 3 and 4, the extent of its outward movement being determined by the engagement of said spacer washers with the flange of stop 56 adjustably secured to the door by screws 56'. At its inner end the plunger is provided with a fixed lobe element 57 which, when the handle is in its normal position, as is indicated in Figs. 4 and 6, then hangs downwardly. The axial shift of plunger 51 inwardly is limited by contact of an end cap 59, secured to its outer end, with stop 56.

To effect the door opening, handle 44 is first turned in a clockwise direction through an angle of 90° bringing the lobe 57 in registry with slot 47 which is dimensioned to accommodate simultaneously both the stud 46 and the inner end of plunger 51, which is then pushed inwardly to register in the slot, whereupon the handle is turned in a counterclockwise direction 90° to its normal position so that the lobe will engage with link 48; and in releasing or pulling out said plunger, said link will be carried along and become disengaged from the stud. The bolts 43 are then free to be drawn out of their respective sockets by action of weight 43', as hereinbefore noted. This will cause unlocking of the door to open.

If, however, automatic release should occur when plunger portion 51 is not extended outwardly through failure of spring 54 to function or due to jamming of the plunger in the inward location, willfully or otherwise, the locking bolts could not be disengaged and doors would not open. To insure release under those conditions, the inner engagement mechanism may be modified, as is indicated in Figs. 7, 8 and 9, 10—the former illustrating the mechanism in the locked position and the latter figures the same in the unlocked position.

In the arrangement shown, a control bar link is not provided with the type of slot 47 of links 48 of the hereinbefore described embodiment, but is slotted to accommodate only the stud 46' in a slot 47'. A lobe-clearing opening or notch 47" is provided in the edge of a link 48' and located somewhat above the stud 46' of the lock mechanism 37'. When a door is in its normal closed and locked state, Figs. 7 and 8, plunger 51' of the handle 44' has been retracted and presses upon the inner surface of one of the control links 48', holding the latter in the position shown with stud 46' in slot 47'; and a control bar 41' is in raised position to locate its rollers on the shelf, as hereinbefore set forth. However, the plunger carries at its inner end a pair of lobes 57' which are arranged not to pass through but only to embrace the link and to allow it to travel freely between said lobes in the event of automatic release in case manual release from outside should occur simultaneously.

In order to swing a control bar link to effect unlocking manually, from outside the stable, of a door by disengaging the link 48' from its stud 46' to free bolts 43' for unlocking movement, plunger 51' is rotated in a clockwise direction through 90°; and said plunger is then pushed inwardly to cause the lobes to embrace said link and engage therewith, Figs. 9 and 10. Thereupon, when the plunger is released, the spring-actuated lobes will pull the link to withdraw its slotted lower end from the stud. A stop 60 limits the descent of the link and a stop 61 that of the lever plate 45'. From the inside, the disengagement may be effected by pushing on the handle 50', after first lifting lever plate 45' together with link 48' slightly to have notch 47" register with lobes 57' of plunger 51'. Since the link is free to slide between the lobes under unlocking conditions, failure of the spring completely to return the plunger, or willful holding of it in the unlocking position, will not interfere with an automatic release under emergency conditions.

In order to reestablish the locked condition of the doors, which may be accomplished only from within the stable, a control bar, through its link 48', is to be elevated manually by use of handle 50' until the rollers thereof are juxtaposed to the high position of the slide shelf, the link having first been freed from the plunger and lobes, through juxtaposition to the clearance notch 47". Thereafter the link is moved to have its slot 47' reengage the stud 46', the lobes pressing against the link to retain the engagement with said stud. The door wing is then swung into closed position.

Figure 1:
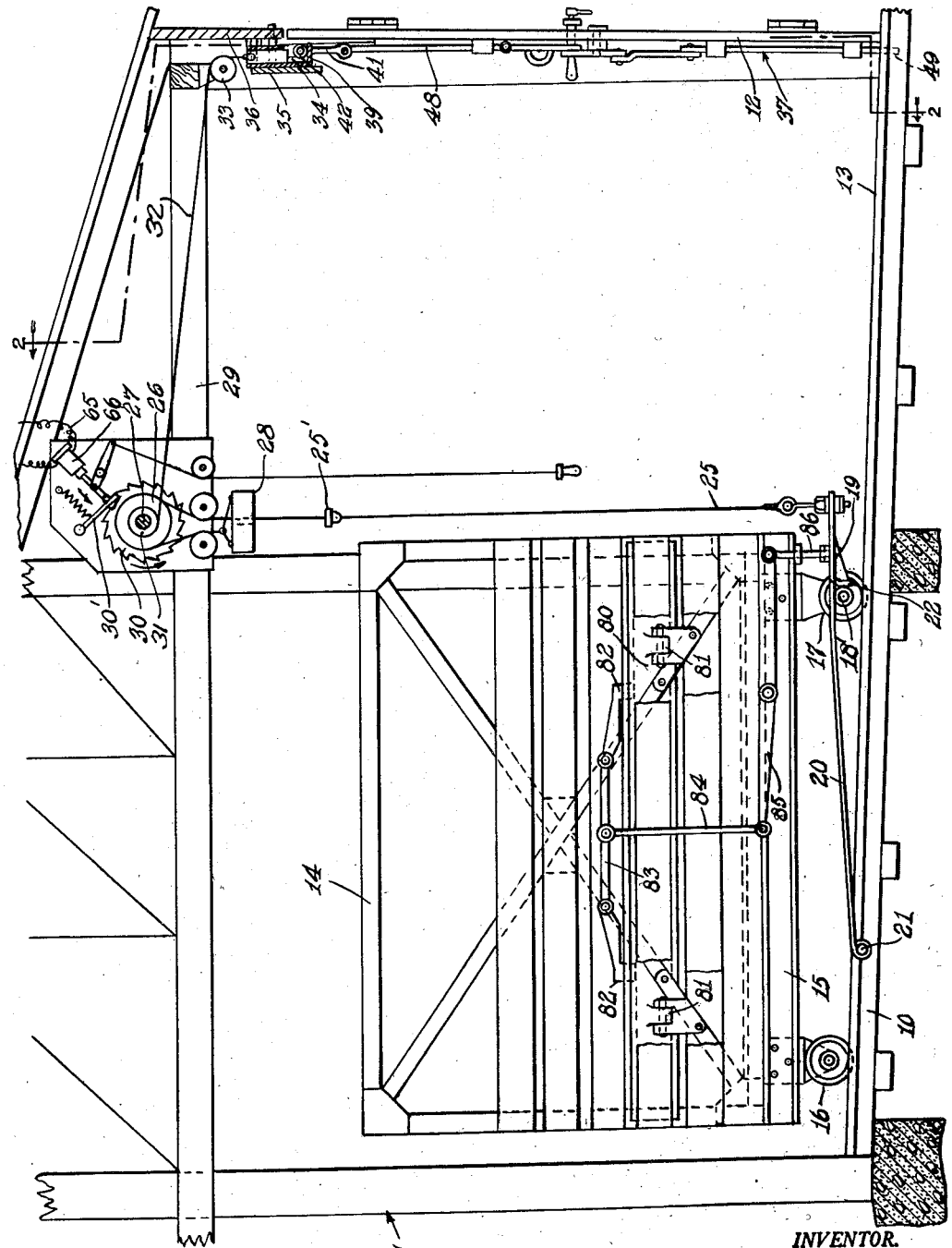
Fig. 1 is a fragmentary longitudinal section through a stable, and shows the mounting of one of a plurality of stalls and associated doors operable in the novel manner when the emergency condition prevails.

In case the doors have been automatically released, provision is made to restore manually the locking status but only from within the stable. To this end cable 25 is manipulated to draw downwardly said cable, thereby rotating the drum to reset it to its normal position, as is indicated in Figs. 1 and 2. To this end, however, the stall must first be restored to its normal location and locked thereto by pivoted member 20. Locking may be accomplished by treading on its outer end. Cables 25 will thereby be drawn downwardly.

While the drawings show doors swinging outwardly, it will be understood that equivalent results may be achieved with doors sliding apart sidewise, or rising to the ceiling, or hinged doors swinging inwardly. Locking and releasing mechanism will have to be altered to suit. Also proper timing of stall and door movement will have to be observed.

The electrical circuit for emergency operation of the stall and door release mechanisms, as well as the alarm and supervisory circuits, are indicated in Fig. 11 and the source of electrical power is indicated by the electrical power main 60. The latter connects to a pair of relays 61, 62 controlled, for example, by thermo-responsive means 63 and 64, respectively, to furnish current through leads 65 to a series of solenoids 66—one for each of the pawl and ratchet means 30, 30' being provided and all connected in series in the energizing circuit. It will be understood that other suitable and well known means (not shown) responsive to emergency conditions may be substituted for the means 63. A transformer coupling 67 serves to connect the leads 65 with alarm devices 68; and the aforesaid solenoids circuit may be energized directly from the main 60 through a switch 69, should it be desired to energize manually the solenoids. This may be accomplished by pushing inwardly the control plunger 69' of the said switch.

A supervisory circuit is employed, also, the same being continuously operative or in case of failure giving suitable alarm. This supervisory circuit is controlled through the said relays 61, 62 through respective sets of contacts thereof 70, 71 to be energized from the main 60, but at reduced current due to the inclusion in the circuit of resistances 72, 73. It will thus result normally in providing sufficient energy to actuate a suitable signal such as the light 74 and bell 75 with long stroke interval. However, when the thermo-responsive means are subjected to a predetermined degree of heat, the relays will throw the energizing circuit for the solenoids directly across the mains and effect actuation not only of such solenoids but also of the primary alarm means 68 included in the circuit, but requiring greater current for operation than is required by the supervisory indicators, as is well understood.

Further provision may be made, if desired, to extinguish an incipient blaze in straw or like combustible material on the floor of a stall. Thus, the drinking-water trough 80 for a stall may be pivotally attached, as at 81, along one side to tilt forwardly when released and spill the water over the stall floor. Normally, the trough will be latched in its water-holding position by means of fingers 82 which extend downwardly over and in front of the upper edge of said trough. These fingers are carried by a pivoted bracket 83 designed to be actuated to free the fingers from their engagement with the trough when an actuating link 84 connected to the bracket is depressed. This link is connected to one end of and is actuated through a lever 85 and depending finger 86 at the other lever end and in engagement normally with the upper edge of the stall release pivoted member 20. When the latter is then elevated under emergency conditions, as hereinbefore set forth, link 84 will follow to move downwardly and raise the fingers 82 to permit the trough to tilt under the action of gravity.

I claim:

1. In a stable for housing animals and provided with an outlet door biased to open, and means normally restraining the door against opening; tracks carried by the floor of the stable, the same leading through the outlet door opening; a stall and rotatable means carried by the stall supporting the latter upon the tracks to ride thereover under its inherent energy outwardly beyond the door opposite a stall; means on the stable, fixed with respect to movement of the stall over its track, to engage normally the stall to hold the latter in its normal location; and disengaging means located within the stable operatively connected with the engaging means to effect interruption of the engagement for release of a stall, together with means responsive to an emergency condition at the stable to effectuate operation of said disengaging means.

2. A stable according to claim 1, wherein a deluge tank is provided in the stall and means are further provided to support the same pivotally along one inner face of the stall, together with means for latching the same normally in upright position, said latching means including an element engageable by the stall restraining means to effect the release of the tank upon initiation of release of said restraining means and permit thereby the tank to tilt for discharge of its contents.

3. A stable according to claim 1, wherein means are provided at the stable interior side of the door whereby it may be restrained only manually against opening and said means engaging the restraining means simultaneously therewith to set it for its automatic release.

4. A stable according to claim 1, wherein electrically actuated and automatically self-restoring, for repeat-operation, means are provided and are operatively interconnected with the means restraining and releasing the stalls and doors.

5. A stable according to claim 1, wherein pawl and ratchet means and drum means rotatably mounted therewith are provided; cable means connect the drum means with the stall engaging means for its release; and means, actuated simultaneously with said release, for release of the means normally restraining the outlet door against opening are provided.

6. A stable according to claim 1, wherein the disengaging means includes kinetic linkage.

7. A stall according to claim 1, wherein the disengaging means comprise pawl and ratchet means together with drum means rotatably mounted therewith, and cable means connect the drum means with the stall-engaging means for release of the latter.

8. A stall mounting according to claim 7, wherein further drum and cable means are provided and are connected with the door-locking means to release the same when the pawl is disengaged.

9. A stall mounting according to claim 8, wherein manually operable means are provided to reset both drum means simultaneously to their respective initial positions.

10. In a stable for housing animals having a plurality of stalls and corresponding doors aligned therewith: pairs of tracks provided along the floor of the stable and inclined downwardly toward the respective doors, and rollers mounting the respective stalls on their tracks; means to engage a portion of a stall and adapted normally to restrain outward movement of the same over its track; means to lock the doors; pawl and ratchet means together with drum means rotatably mounted therewith, and cable means connecting the drum means with the stall-restraining means and with the door locking means, together with solenoids associated with the pawl of the pawl and ratchet means for effecting disengagement of said pawls, all of said solenoids being electrically connected in series in an energizing circuit common thereto, and means located within the stable responsive to emergency conditions therein initiating energization of the solenoids circuit.

11. A stable according to claim 10, wherein an electrically responsive supervisory circuit is superimposed upon the solenoids circuit.

References Cited in the file of this patent
UNITED STATES PATENTS

| | | |
|---|---|---|
| 411,834 | Peters | Oct. 1, 1889 |
| 520,395 | Edmonds | May 22, 1894 |
| 610,806 | Gover | Sept. 13, 1898 |
| 856,727 | Ruthven | June 11, 1907 |
| 1,173,689 | Van Matre | Feb. 29, 1916 |
| 1,449,954 | Radoush | Mar. 27, 1923 |